United States Patent [19]

Degen et al.

[11] Patent Number: 5,356,651
[45] Date of Patent: * Oct. 18, 1994

[54] MANUFACTURING METHOD FOR PRODUCING STERILE MILK USING DYNAMIC MICROFILTRATION

[75] Inventors: Peter J. Degen, Huntington, N.Y.; Tony Alex, Kendall Park, N.J.; Joseph W. Dehn, Jr., Great Neck, N.Y.

[73] Assignee: Pall Corporation, East Hills, N.Y.

[ * ] Notice: The portion of the term of this patent subsequent to Oct. 26, 2010 has been disclaimed.

[21] Appl. No.: 998,371

[22] Filed: Dec. 30, 1992

[51] Int. Cl.$^5$ .................. A23C 1/00; B01D 61/00
[52] U.S. Cl. ................... 426/491; 426/492; 426/519; 426/522; 210/651; 210/636; 210/791
[58] Field of Search ............... 426/491, 495, 522, 492, 426/580, 519; 210/650, 636, 651, 791; 99/452

[56] References Cited

U.S. PATENT DOCUMENTS

| | | | |
|---|---|---|---|
| 3,966,131 | 12/1976 | Conn | 210/636 |
| 4,140,806 | 2/1979 | Glimenious | 426/491 |
| 4,740,308 | 4/1988 | Fremont et al. | 210/636 |
| 4,876,100 | 10/1989 | Holm et al. | 426/491 |
| 4,897,277 | 1/1990 | Dieu et al. | 426/491 |
| 5,028,436 | 7/1991 | Gauri | 426/491 |
| 5,256,437 | 10/1993 | Degen et al. | 426/580 |

FOREIGN PATENT DOCUMENTS

| | | | |
|---|---|---|---|
| 1059456 | 5/1976 | Japan | 210/636 |
| 3057185 | 5/1978 | Japan | 210/636 |
| 2254805 | 11/1987 | Japan | 210/636 |

Primary Examiner—Robert A. Dawson
Assistant Examiner—Ana M. Fortuna
Attorney, Agent, or Firm—Leydig, Voit & Mayer, Ltd.

[57] ABSTRACT

A method for treating raw milk to produce treated milk having a lower bacterial content than the raw milk. The milk is homogenized and, within about 5 minutes from the homogenization, subjected to dynamic microfiltration, to yield a filtrate which has a lower bacterial content than the initial raw milk. When the flow rate of milk through the microfilter drops below a predetermined level, the dynamic microfilter is removed from milk filtration service, flushed with water, and returned to milk filtration service, the steps being repeated as necessary until the membrane cannot be rejuvenated to a minimum filtration capacity, at which time the membrane is subjected to chemical cleaning to essentially restore the original filtration capacity of the membrane.

15 Claims, 7 Drawing Sheets

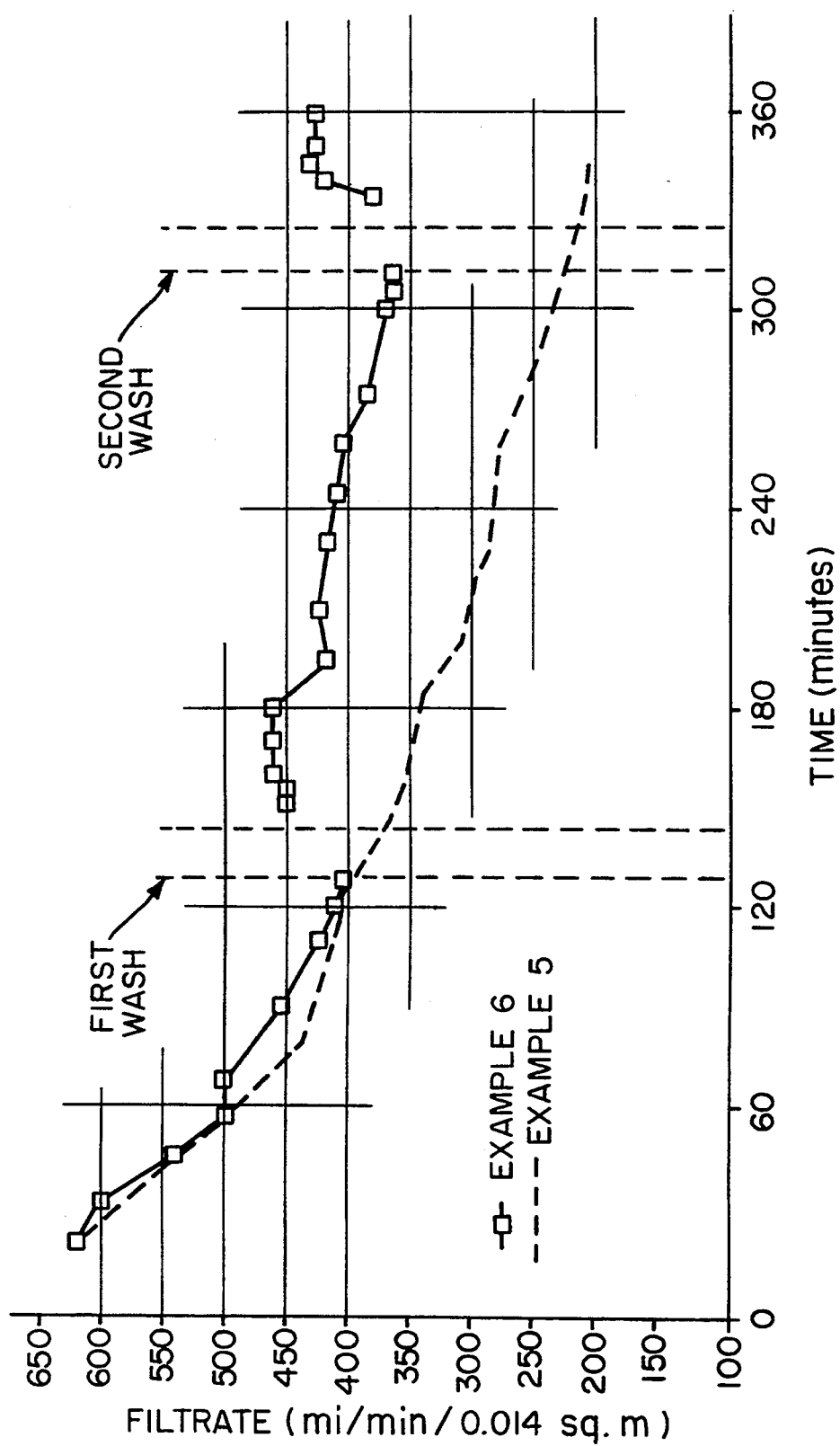

MANUFACTURING METHOD FOR PRODUCING STERILE MILK USING DYNAMIC MICROFILTRATION

FIELD OF THE INVENTION

The present invention relates to a method for producing milk, either whole or skim milk, with a lowered bacterial content, wherein dynamic microfiltration is used.

BACKGROUND OF THE INVENTION

The well known pasteurization process to kill bacteria in milk has been used for many decades. Unfortunately, the higher temperatures needed in the pasteurization process adversely affect the flavor of the milk. Further, even with the use of such high temperatures, the pasteurization process does not eliminate all undesirable bacteria, leading to the short storage stability of most milk products.

*Bacillus cereus* are often the predominant bacteria in conventionally processed milk of relatively advanced age, because they can survive the pasteurization process and they thrive at cold temperatures, promoting the spoilage of the milk. A general need exists for a method for reducing the content of bacteria in milk, both whole and skim milk, to enhance the storage stability of the product and to improve its flavor by elimination of the pasteurization process.

Various methods for producing milk with a lowered bacterial count through the use of filtration have been known in the art, but none have found wide acceptance. The prior art methods generally provide either poor flow rates, rendering the method uneconomical on a large scale, or adversely affect the quality of the milk, making the product unacceptable to consumers.

It is clear, then, that the pores of bacteria filters used in the art, which filters are effective to sterilize milk, also will remove not only the bacteria, but also the fat globules, and at least some of the proteins. Such a filter quickly becomes blocked by trapped material; hence, the flow rate through the filter rapidly declines and the filter must be frequently cleaned or replaced. The high cost of such an inefficient process is generally prohibitive. Further, because the filter holds fat globules and proteins, the quality of the milk is also adversely affected.

From the foregoing discussion, it is apparent that there is a continuing need for an improved milk filtration processing method that can provide a sterile, or more nearly sterile product, that has an improved storage life, that and does not adversely affect milk quality.

Some attempts have heretofore been made to use cross-flow, or tangential flow, filtration devices to treat milk, such devices being known in the art.

Cross-flow filtration is substantially different from through-flow filtration, in that the liquid feed is introduced parallel to the filter surface, and filtration occurs in a direction perpendicular to the direction of the feed flow. In cross-flow filtration systems, generally, because the direction of the feed flow is tangential to the membrane surface, accumulation of the filtered solids on the filtering medium is reduced by the shearing action of the flow. Cross-flow filtration thus affords the possibility of a quasi-steady state operation with a nearly constant flux when the driving pressure differential is held constant. Those particles initially entering into the wall matrix ultimately become entrapped within it, because of the irregular and tortuous nature of the pore structure. As microfiltration proceeds, penetration of additional small particles into the wall matrix is inhibited by the presence of the dynamic membrane. The formation of the dynamic membrane, together with the possible clogging of the pore structure of the tube by entrapped particles, results in a decline in the filtration flux. In conventional systems, this decline is approximately exponentially related to filtration time.

Crossflow filtration of milk has been attempted, but has not been generally accepted because of the problems discussed above.

Clearly, the use of crossflow filtration, to date, has not provided an acceptable method for reducing bacterial contamination in milk.

One means to overcome some of the problems associated with classical crossflow filtration technology, known as dynamic microfiltration, has emerged. The dynamic filtration process overcomes the disadvantage in the classical crossflow technology because the liquid to be filtered is not simply guided tangentially over the membrane surface. The membrane surface or a solid body near the membrane surface is moved such that the fluid at the interface between the rotor and the stator is subjected to shearing action. The shearing action tends to "scrub" the membrane surface, keeping it relatively clear of particulate material, and preventing a filter cake from forming on the membrane surface. The particulate material that would otherwise collect on the membrane surface remains suspended, and is ultimately removed in the secondary stream, generally referred to as a concentrate stream.

It was previously discovered, as set forth fully in copending application Ser. No. 07/901,238, filed Jun. 19, 1992, that dynamic microfiltration of milk can be successfully accomplished, without the prior art problems of degradation of milk quality, premature filter plugging, and inadequate bacterial removal, through the use of dynamic microfiltration.

In accordance with the aforementioned application Ser. No. 07/901,238, milk, either whole or skim milk, is first homogenized and then subjected to filtration. By performing the homogenization step first, the particle size of the fat globules and other large, suspended components of the milk is significantly reduced, allowing for microfiltration of the milk without significant removal and entrainment of the fat and other components.

Milk is an emulsion of fat and protein particles in water. Homogenization provides for a method of reducing the emulsion particle size to allow passage through an appropriately sized microporous membrane, to retain bacteria contained therein without unwanted removal of the fat and protein content of the milk.

The milk, after homogenization, is filtered through the use of dynamic microfiltration. The invention described in application Ser. No. 07/901,238, thus provides an improved method for producing milk with a lowered bacterial content, without the need for pasteurization. That portion of the milk fraction that is retained by the microfilter (the concentrate fraction), may be recirculated as part of the feed, or may be discarded or used in other processes.

In particular, the method of said application Ser. No. 07/901,238, comprises homogenizing the milk and within about 5 minutes from the homogenization, subjecting the milk to dynamic microfiltration by passing the milk through a microfilter having an average pore size sufficient to reduce the bacterial content of the milk flowing therethrough, to yield a filtrate which has a lower bacterial content than the initial raw milk and a concentrate having a higher bacterial content than the initial raw milk. The resulting milk has a very low bacterial content, such as about $10^3$ bacteria per milliliter, or less, and retains more organoleptic components than that found in pasteurized milk with the same bacterial content.

Although the method of said application Ser. No. 07/901,238 provides a useful means of accomplishing the goal of milk filtration, all as discussed above and in said application, which is hereby incorporated by reference in its entirety to the full extent as if it were set forth herein, one area of possible improvement related to said method concerns the drop in filtration flow rate with time. Although the method of said application accomplishes a result not previously achievable, the filtration of milk to provide a substantially sterile product with better storage, taste, and other properties than pasteurized milk, the method does present the problem that as filtration time becomes extended, the flow rate of the milk through the membrane diminishes, resulting in decreased efficiencies in the method, with time. If the process is continued, ultimately flow through the membrane will essentially cease. Of course, at some time significantly before ultimate cessation of flow, the method becomes uneconomical to operate commercially. It may not be possible to simply replace the membranes used in the dynamic filtration, due to the cost of the membranes, as well as to the cost associated with frequent changing of such membranes.

The flow of milk through, for example, a microfilter employing a 0.45 $\mu$m membrane, diminishes, as a general matter, at a rate such that after about 9 hours of milk filtration, the flow rate of milk through the membrane has decreased to about one-half of the initial milk flow rate, at a constant pressure.

A need therefore exists for a means to modify the method of the 07/901,238 application to overcome the problem of reduced flow rates with the passage of time, to thus render the method more economically acceptable.

SUMMARY OF THE INVENTION

It has now been found that by means of carefully controlled and selected flushing and cleaning operations on the membrane used in the dynamic filtration of milk, it is possible to maintain relatively high flow rates through the membrane. In particular, it has been found that by use of water, passing through the membrane, preferably in the forward direction, for a relatively short period of time, it is possible to return to the membrane a significant percentage of its initial filtration capability. The fact that a flushing of the membrane with water is capable of such a dramatic rejuvenation of the filtration capacity of the membrane is truly surprising.

The unfortunate aspect of the flushing of the membrane, as described, however, is that although a significant portion of the filtration capability of the membrane is returned, the fact remains that after each flushing, some residual filtration capacity is not restored. Further, the amount of filtration capacity that is not restored after each flushing is cumulative, so that after a sequence of several flushings, the filtration capacity of the membrane will remain below an acceptable level for commercial use.

Secondly, then, it has been discovered that by use of an additional chemical cleaning step, it is possible to restore to a microfilter essentially all of its original filtration capacity. Such a chemical cleaning step, however, is undesirable from the standpoint of time as well as system integrity. Chemical cleaning requires a significantly longer period of time to achieve its desired goal than does water flushing. Further, chemical cleaning requires the use of exogenous agents, such as caustic, enzymes, or other additives to restore the filtration capacity. Such agents must be completely removed from the system before it can be returned to service to produce sterile milk. Accordingly, chemical cleaning cannot be used as the sole means to return filtration capacity to microfilters, because such a technique would require significant down-time during the operation of the milk processing facility. Although multiple filtration units could be employed in parallel, providing the opportunity to use one filtration unit while another or others are being cleaned, such an approach, particularly if it requires the use of many such filtration units, is undesirable because of the high economic investment costs required in purchasing and maintaining such multiply redundant equipment.

It has been discovered, however, that by combining the water flush with chemical cleaning, an acceptable means to maintain filtration capacity exists. Accordingly, in accordance with the present invention, after the filtration capability of a dynamic membrane has dropped below a predetermined value, the membrane is flushed with water until a predetermined level of filtration capability has been restored, at which time the filtration unit is returned to filtration service. Once the filtration capability of a membrane has again dropped below a predetermined value, the membrane is again flushed with water until a predetermined level of filtration capability has been restored. Such a cycle can be repeated until the filtration capacity cannot be restored to a minimum capacity, at which time the microfilter is subjected to chemical cleaning for a period of time sufficient to restore the filtration capacity of the membrane to at least a minimum predetermined level. The filtration unit then is returned to filtration service.

Thus, the present invention provides a method for treating raw milk to produce treated milk having a lower bacterial content than the raw milk, comprising, within about 5 minutes from the homogenization, subjecting the milk to dynamic microfiltration by passing the milk through a microfilter having an average pore size sufficient to reduce the bacterial content of the milk flowing therethrough, to yield a filtrate, which has a lower bacterial content than the initial raw milk and a concentrate having a higher bacterial content than the initial raw milk, wherein the improvement comprises the sequential steps of (1) removing the dynamic filtration unit from milk filtration service after the filtration capacity of the membrane has dropped below a predetermined value and flushing the microfilter with water, said flushing continuing until at least a predetermined level of filtration capacity has been restored to the membrane;

(2) returning the dynamic filtration unit to milk filtration service;

(3) repeating steps (1) and (2) one or more times;

(4) subjecting the membrane to chemical cleaning for a period of time sufficient to restore the filtration capacity of the microfilter to at least a minimum predetermined level; and (5) returning the dynamic filtration unit to milk filtration service.

The actual cause of membrane "fouling" that occurs during the dynamic microfiltration of milk is most likely multi-faceted. Fat from the milk, over a period of time, is believed to crystallize within the membrane, commensurately reducing flow. The application of high temperature, as through the use of hot water or hot milk, as an alternative, at least in part, to hot water, will cause melting of much of the crystallized fat, thus removing the obstruction caused by such crystals.

Some raw milk components will also become physically adhered to the surface of the membrane, forming a surface layer or "plastering" of the surface. Application of high velocity water or milk, through flushing, can be employed to break the physical adherence of at least a portion of such matter to the membrane surface.

Another cause of membrane fouling is believed to be the physical entanglement of particulate matter within the membrane structure whereby such particulate matter simply becomes caught or entrapped within the membrane. The application of high turbulent flow, with water or milk, provides, again, a means for removing some entrained particles.

When the flushing procedures, as described herein, are not sufficient to restore a significant portion of the residual filter capacity of the membrane, chemical cleaning must be employed.

BRIEF DESCRIPTION OF THE DRAWINGS

FIG. 7 is a diagram showing a flux rate versus time for the process of the present invention.

DESCRIPTION OF THE PREFERRED EMBODIMENTS

Figure 1:
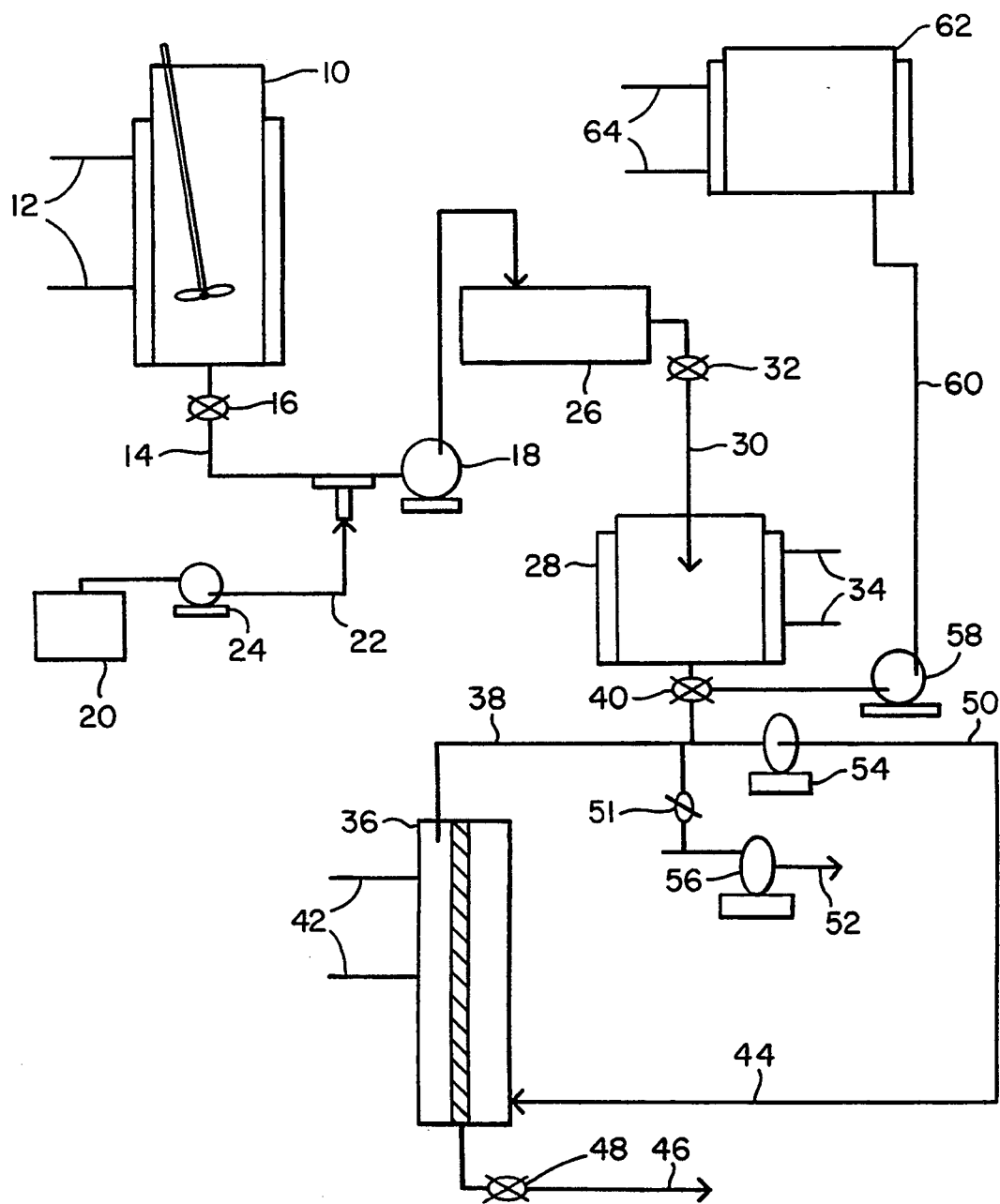
FIG. 1 is a schematic diagram of the equipment employed in accordance with the method of the present invention.

The initial material is fresh, untreated raw milk, as from a domestic animal, such as a cow. The method of the present invention may also be applied to processed milk, such as that already subjected to pasteurization, but the full advantages will not be realized, such as the production of milk with improved organoleptic properties, when compared to milk that has not been pasteurized.

The raw milk to be processed may first be directed through a heat exchanger to adjust it to a suitable temperature, and if desired, then passed through a centrifugal separator, to remove all or a portion of the cream fraction in a conventional manner.

As an overview, the raw milk is homogenized and reasonably promptly passed through a dynamic microfilter, yielding a filtrate fraction and a concentrate fraction. The pores in the microfilter are sized to retain at least a portion of the bacteria. The filtrate, which is the portion of the milk fraction that passes through the retaining surface of the membrane, consists of milk with no, or a lowered, bacterial content (relative to the milk before microfiltration), with essentially no change in the fat and protein content. The filtrate fraction may then be used directly to make other products, such as powdered milk, or packaged without further treatment.

The concentrate fraction, which is the portion of the milk fraction that is retained by and recovered from the retaining membrane surface of the membrane, consists of milk with an increased bacterial content (relative to the milk feed prior to microfiltration) and essentially no change in fat globular and protein content. The concentrate fraction subsequently may be discarded or used in other processes.

The filtrate may contain some bacteria, but the lower the bacterial content, the more storage-stable the product. Full sterilization is desirable, but the initial growth rate of a small remaining concentration of bacteria is usually low enough to still result in greatly increased storage life of the resultant milk product.

HOMOGENIZATION

The milk fraction is first preferably heated or cooled, after centrifugal separation, if employed and prior to homogenization, to a suitable temperature for homogenization. The milk is then passed into a homogenizer where the fat emulsion size is reduced to a size sufficient to allow passage through the membrane. Preferably, the size of all suspended particles is less than about 1 micron more preferably, below about 0.5 micron. It is important that the milk, after homogenization, be filtered relatively soon thereafter. Preferably, the filtration will be in less than about 5 minutes, preferably less than about 2 minutes, and most preferably in less than about 30 seconds, after the homogenization.

Again, the important factor is not the holding time prior to filtration, but rather the fact that filtration occurs prior to any substantial agglomeration of globules, forming a substantial number of particles larger than about 1 micron.

DYNAMIC FILTRATION

In the present invention the filtration is performed as a dynamic filtration, that is the filtration medium itself is kept in constant motion so that the effective flow rate of milk across the medium is extremely high. The particular physical form of the dynamic filter is not critical. Thus, the membrane medium may take the form of discs or cylinders, for example. Such dynamic microfiltration devices that are suitable in the practice of the present invention include those described in the following references, all of which are incorporated herein by reference: U.S. Pat. Nos. 5,037,562; 3,997,447; 5,037,562; 3,997,447; 4,956,102; 4,956,102; 4,900,440; 4,427,552; 4,093,552; 4,066,554; and 3,797,662. Among the preferred disc filters are those of the type disclosed in copending U.S. patent application Ser. No. 07/812,123, filed on Dec. 24, 1991, the specification of which is incorporated herein by reference.

The dynamic microfiltration allows for a wide range of effective surface velocities for the filtration medium relative to the milk feed. For example, an effective surface velocity of from about 3 m/sec to about 50 m/sec is usable, especially from about 5 m/sec to about 30 m/sec, most preferably from about 8 m/sec to about 20 m/sec.

To achieve the desired surface velocities a representative filtration medium in the form of a cylinder with a diameter of about 2.5 inches will need to be rotated at a rate of about 1,000 to about 6,000 revolutions per minute (rpm) with a rate of about 5,000 rpm being typical.

If a dynamic disc filtration device is employed, a typical disc filtration medium will have dimensions of about 2 inches to about 48 inches, in diameter. Such discs may, for example, be rotated at speeds from about 1,000 rpm to about 8,000 rpm, typically from about 3,000 rpm to about 6,000 rpm, depending upon the design of the particular dynamic microfilter that is employed. Preferably, the shear rates of such disc filters will be from about 100,000 sec$^{-1}$ to about 400,000 sec$^{-1}$.

The microfilter pores are sized so as to retain the bacteria that are present in the milk while still maintaining an acceptable flow rate through the microfilter. Useful membranes include hydrophilic microporous membranes with good flow properties, narrow pore size distribution and consistent bacterial removal performance for the bacteria of interest. The pore size rating of the microfilter membrane should be from about 0.01 to about 5.0 microns, as determined by those methods known in the art, the tests known as the "bubble point" (ASTM F316-86) and the $K_L$ method (U.S. Pat. No. 4,340,479). Preferably, the pore size rating will be from about 0.1 to about 1 micron. Most preferably, membranes are employed that have pore size ratings from about 0.2 to about 0.5 micron. Such microporous membranes are well known and are readily available.

Preferred microporous membranes that may be used in accordance with the present invention include those sold by Pall Corporation under the trademarks Ultipor N$_{66}$ ®, Fluorodyne ®, and Posidyne ®; those available from Cuno Corporation under the trademark Zetapore, and those sold by Millipore under the trademark Durapore ®.

The cylindrical membrane elements of use in the present invention include those that may be attached to a support in a leak-tight manner, in accordance with methods known in the art.

Ultimately, the bacteria should be concentrated into a stream that is less than about 5% of the feed and greater than about 95% of the solids and proteins normally found in the milk should pass through the membrane, for extended periods of time.

The dynamic microfilter can be operated single pass without the necessity of recycling the concentrate. If desired the concentrate can be recycled to the feed. When a cylindrical dynamic microfilter is employed, it can be operated at various ratios of filtrate flow to the total feed flow (concentration factors). However, the cylindrical dynamic microfilter is advantageously operated at filtrate to feed ratios of above 90%, especially about 95%, and particularly above 98% in order to produce predominately the very low bacteria content filtrate as the desired product.

Similarly, when a rotary disc dynamic microfilter is employed, it also can be operated at various ratios of filtrate flow to the total feed flow. However, the rotary disc dynamic microfilter may be operated at filtrate to feed ratios over a wide range. Selecting a high ratio will simply lower the throughput, whereas operation at a low ratio will result in a higher throughput. It is believed that operation at a ratio of about 40% is advantageous in order to maintain a stable flow rate through the filter, although other ratios may be employed.

The filtration of the freshly homogenized milk may be done warm at 40° C. to 60° C. which is at or somewhat above the crystallization temperature of about 40° C. of the higher melting components of milk fat. This is below the temperatures employed in conventional thermal pasteurization. Alternatively, with some degradation in flow rate, the milk may be filtered at much lower temperatures, such as from about 15° to about 35° C., particularly from about 20° to about 25° C.

FLUSHING

As indicated, after an initial period of filtration, the flow rate through the membrane will drop below a predetermined level, at which time the dynamic microfilter should be removed from milk filtration service. The predetermined level at which the dynamic microfilter should be removed from service and subjected to flushing will vary depending upon the specific apparatus employed and the operational parameters related thereto. Accordingly, the present process is applicable over a wide range of conditions and is not limited to any specific flow rate at which the microfilter must be flushed. However, flow rate higher than that used for milk filtration should be used, five to ten fold higher flow rates being preferred.

Forward flushing of the microfilter with water may be performed at any desired flow rate and pressure. Likewise, the water flush can be employed over a wide range of temperatures. It is usually preferable to use water that is at a temperature from about 20° to about 100° C., preferably from about 50° to about 80° C., most preferably from about 65° to about 80° C. The system may even be placed under superatmospheric pressure, if desired, to employ water flushing at temperatures in excess of 100° C., if desired. The flushing should be in the forward direction, that is the same direction as the normal flow of milk through the microfilter. Under certain conditions, reverse flow may be achieved and may accomplish similar results. Normally, however, forward flow of the flushing water is preferred. Under certain conditions, it is possible to flush the membrane with milk at temperatures hotter than regular process temperature.

The flushing is continued until at least a predetermined level of filtration capacity has been restored to the membrane. Again, the predetermined level at which the flushing of the membrane should be discontinued will vary depending upon the specific apparatus employed and the operational parameters related thereto. Accordingly, the present process is applicable over a wide range of conditions and is not limited to any specific flow rate at which the flushing of the microfilter should be discontinued.

After the flushing is completed, the microfilter is then returned to milk filtration service. After a period of milk filtration, the flow rate through the membrane will again diminish to a point below a predetermined level and the removal of the dynamic microfilter from service, flushing of the membrane, and returning the microfilter to service will be repeated for one or more times.

An unexpected and surprising aspect of the present invention is the fact that forward flushing of the membrane, that is in the same direction as milk flow through the filter, results in cleaning of the membrane. Other membrane cleaning techniques in other fields employ, typically, reverse flow direction flushing, not forward flow flushing.

It will be possible, in some instance, to replace water flushing, in whole or in part, with milk flushing. When milk flushing is employed, the milk should be passed through the membrane at elevated velocities with respect to the normal filtration flow rate. Such milk flushing has the advantage of eliminating the possibility of introducing exogenous materials into the system. Because forward flushing is employed, it is possible to apply higher than normal pressure to the membranes to achieve the higher flow rates, without substantial concern that the membrane will be damaged. The use of forward flow means that the membrane will continue to be supported in the same fashion as it is when normal filtration is occurring, thus allowing the application of much higher pressures than if reverse flow were employed.

CHEMICAL CLEANING

At some point the membrane will not be capable of sufficient regeneration through the flushing procedure. Once this point is reached it will be necessary for the microfilter to be subjected to chemical cleaning for a period of time sufficient to restore the filtration capacity of the membrane to at least a minimum predetermined level. Once again, the predetermined level at which the chemical cleaning of the membrane should be employed will vary depending upon the specific apparatus employed and the operational parameters related thereto. Accordingly, the present process is applicable over a wide range of conditions and is not limited to any specific flow rate at which the chemical cleaning of the membrane should be commenced.

After the chemical cleaning is completed, the membrane is thoroughly rinsed to render it sterile and free from any contaminating agents, and is then returned to milk filtration service. The chemical cleaning is continued until at least a predetermined level of filtration capacity has been restored to the dynamic microfilter. Again, the predetermined level at which the chemical cleaning of the membrane should be discontinued will vary depending upon the specific apparatus employed and the operational parameters related thereto.

The agents used for chemical cleaning can vary widely, as their purpose is to free the membrane from entrained materials, such as fats, proteins, glycoproteins, and other organic materials that cause a diminution in the flow rate through the membrane, including pyrogens, cell debris, and the like. In this respect, treatment with dilute caustic solutions, such as aqueous solutions of sodium hydroxide or potassium hydroxide, is usually preferable. Enzymatic formulations, such as Terg-a-zyme from Alconox, Inc. and those containing proteases and lipases with and without caustic, may also be used to cause chemical degradation of entrained substituents. Additionally, the use of surface active agents may be employed, which will cause a reduction in surface attraction between the entrained materials and the external and internal surface regions of the microfilter.

An advantage of the dynamic microfiltration system and method employed in accordance with the present invention is that it may be cleaned with the aforementioned caustic and enzymatic cleaning formulations. Such formulations are typically used to clean milk processing equipment in a dairy and are therefore available for use in the present method, without the need for substantial additional expenditure by the dairy.

CYCLE TIMES

As indicated, the specific predetermined levels at which the flushing or chemical cleaning of the microfilter should be employed will vary depending upon the specific apparatus employed and the operational parameters related thereto. Accordingly, the present process is applicable over a wide range of conditions and is not limited to any specific flow rate at which the flushing of the dynamic microfilter should be discontinued. Commensurately, then, the specific cycle times that may result are also not fixed.

As examples of typically expected cycle times, if one employs a 0.45 $\mu$m membrane, it should be expected that the flow will drop to about one-third, or less, of the initial flux rate, after about three to four hours, for the first use of the membrane, with the time required to reach a similar reduction in flux rate becoming less with each flushing. One expected cycle, then would be, for example, an initial cleaning after perhaps three hours of operation, a second flushing after perhaps another three hours of operation, third and fourth flushings after about two and one-half hours of operation, respectively, and fifth and sixth flushing after perhaps additional periods of two hours each, taking the total time to sixteen hours, including the time necessary to perform the flushing, which would be a normal period of milk processing in a dairy.

After the sixteen hours, the membrane would then be treated to a chemical degradation process, as discussed previously, to essentially restore all of the initial filtration capacity of the membrane, bringing the achievable flux rate to perhaps 98 percent, or better, of the initial flux rate for that membrane. Obviously, the cycle times will vary, as indicated, depending upon the particular equipment and operating parameters, as well as upon the quality of the milk being filtered.

Cycle times may also be viewed from the standpoint of percentage decreases of flux rate and flushing times and chemical degradation treatments may be viewed from the standpoint of percentage increases in flux rate. Thus, one may view the time between initiation of initial milk filtration and the initiation of the first flushing cycle as being based upon a predetermined decrease in milk filtrate flux rate.

It is preferable to initiate the first water flushing when the flux rate has dropped to about 60 to about 70 percent of the initial flux rate. The flushing cycle should be continued until from about 80 to about 95 percent of the membrane's flux rate, at the beginning of its last milk filtration cycle, has been restored. The membrane is returned to milk filtration service wherein it will have a second cycle flux rate that is lower than its initial first cycle flux rate. The microfilter will remain in milk filtration service until its flux rate has fallen to about 60 to about 70 percent of the initial flux rate at the beginning of the second milk filtration cycle, at which time a second flushing step is employed, until from about 80 to about 95 percent of the microfilter's flux rate, at the beginning of its last (second) milk filtration cycle, has been restored.

The aforedescribed milk filtration and flushing steps will be repeated, as necessary, until the flux rate of the membrane is such that it cannot be restored, by flushing, to a minimum percentage of its first cycle initial flux rate, such as 40 percent. That minimum flux rate is variable, as are the percentage flux rates at which the flushing cycles are commenced or stopped, and as indicated, are principally a function of equipment and operating parameters. The minimum residual flow is a compromise involving many factors. One must consider the increase in flow that may be anticipated as a result of a flushing or chemical cleaning step versus the downtime for the equipment and the costs of such flushing and cleaning, as well as other factors.

The previously described procedure in accordance with the present invention may be best understood by reference to a hypothetical microfilter used, as discussed previously, in the filtration of milk. In the following example, it will be arbitrarily established that the flushing cycles will be predetermined to be employed when the microfilter flux rate falls to 70% of its prior cycle initial flux rate and that flushing will be employed to restore the membrane to 90 percent of its prior cycle initial milk filtration flux. Finally, the membrane will be subjected to chemical degradation when the flux rate cannot be restored to 50 percent of its first cycle, initial milk filtration flux rate by flushing. A hypothetical plot of cycle times and values is set forth in FIG. 6.

Figure 6:
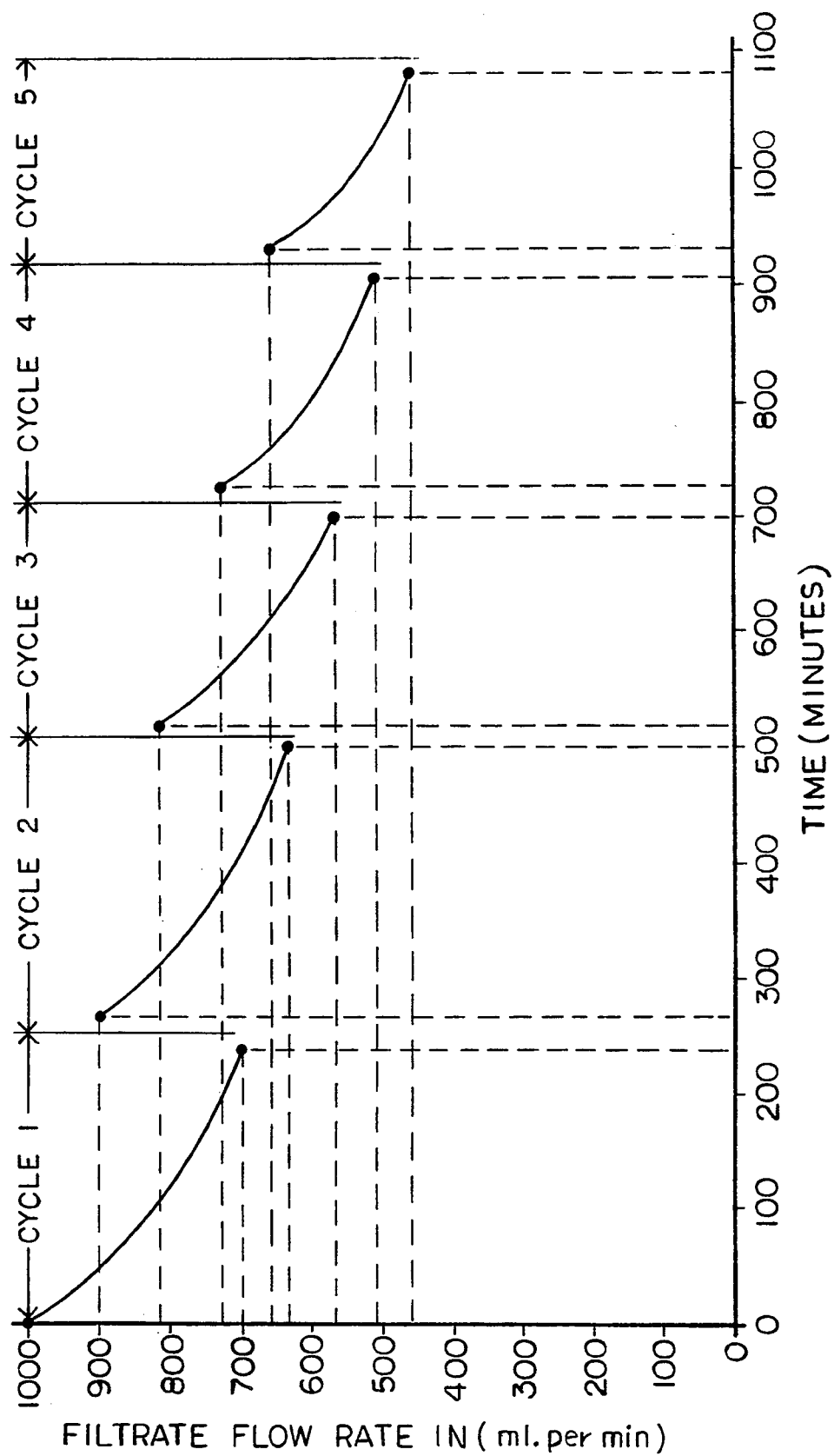
FIG. 6 is a hypothetical plot of cycle times and values for the process of the present invention.

As shown in FIG. 6, the initial flux rate for the microfilter was 1,000 ml per minute, and that flux rate declined to 700 ml per minute after 240 minutes, at which time 20 minute flushing is employed, returning the flux rate to 900 ml per minute. After an additional 240 minutes of milk filtration service, the flux rate falls to 630 ml per minute, at which time a 20 minute flushing is employed, returning the flux rate to 810 ml per minute (90% of the second cycle initial flux rate).

Filtration is continued for 180 minutes, when the flux level has fallen to 570 ml per minute (70% of the third cycle initial flux rate). The membrane is flushed for 25 minutes, at which time the flux is restored to 730 ml per minute (90% of the third cycle initial flux rate).

After an additional 180 minutes of milk filtration service, the flux rate falls to 510 ml per minute (70% of the fourth cycle initial flux rate), at which time a 25 minute flushing is employed, returning the flux rate to 660 ml per minute (90% of the fourth cycle initial flux rate).

After an additional 150 minutes of milk filtration service, the flux rate falls to 460 ml per minute (70% of the fifth cycle initial flux rate). As flushing cannot restore the flux rate to a level above 50% of the microfilter's first cycle initial flux rate (500 ml per minute), chemical cleaning must be employed, taking four hours, at which time the flux of the microfilter is restored to 1,000 ml per minute.

GENERAL

After microfiltration, the concentrate may be discarded in any acceptable manner, subjected to further processing, or used directly.

The method of this invention may be used to advantage where the desired end product is either whole milk, standardized milk, or skim milk.

Suitable apparatus for carrying out the method of the invention can be constructed by interconnecting conventional equipment including centrifugal separators, homogenizers, microfilters, sterilization units, heat exchanger and pumps. Those skilled in the art will readily be able to provide valves for flow and pressure control and other necessary support equipment to make such apparatus operable, and to then make further conventional modifications to such apparatus as needed in particular cases.

Although the present invention has been described in the context of milk filtration, it is anticipated that the present method may be employed in the processing of other fluids, such as wine and beer, in essentially the same manner as for milk, as described herein.

All references discussed hereinabove are incorporated herein by reference.

The examples below further illustrate particular embodiments, but in no way are intended to limit the scope of the invention, which is defined in the claims.

1. Description Of Filtration Apparatus

In FIG. 1 there is shown a general equipment configuration, which may be used to practice the process of the present invention. Of course, the specific equipment, the specific arrangement thereof, and the specific operating conditions may all be altered in accordance with the present invention, by one of ordinary skill in the art.

Referring specifically to FIG. 1, a jacketed process vessel 10 is employed to house milk; prior to treatment, the jacketed process vessel being heated and/or cooled, as necessary, through heating and cooling lines 12. Milk from the jacketed process vessel passes to homogenizer 26, via conduit 14, in which is located valve 16 and pump 18. For use in assessing the bacteria removal of the present invention, bacteria supply 20 is in communication with conduit 14, via conduit 22, in which is located pump 24. Homogenizer 26, in turn, is connected to surge tank 28, via conduit 30, in which is located valve 32. The surge tank is heated or cooled, as necessary, via heating and cooling lines 34. Surge tank 28, in turn, is in communication with the dynamic microfilter 36, via conduit 38, in which is located valve 40. The dynamic microfilter is heated and/or cooled, as necessary, via heating and cooling lines 42. Permeate exits the dynamic microfilter via conduit 46, in which is located valve 48 and retentate is either removed or recirculated via conduits 50 and 52, employing synchronized pumps 54 and 56. Control valve 51 regulates the respective flow between the synchronized pumps. Recirculated retentate enters the dynamic microfilter via conduit 44, which communicates with conduit 50. Clean water is retained in clean water tank 62, which is in communication with conduit 38 via conduit 60, which is in communication with three-way valve 40, pump 58 being located in conduit 60. The clean water tank is heated and/or cooled via heating and cooling conduits 64.

2. The dynamic microfilter in disc format

The disc format consists of a six inch diameter membrane support disc mounted on a hollow shaft and contained within a leak-tight housing, with required fluid inlet and outlet connections. The support disc had provisions for sealing membrane sheets to its face in a leak-tight manner and contained drainage spaces to carry filtrate flow through the membrane and disc, and out through the shaft. Effective membrane area was 0.014 $m^2$ and rotation rates up to 4500 rpm were available.

Any of the dynamic disc microfiltration units discussed previously may be employed in the practice of the present invention.

3. Description of membrane filter elements

The membrane filter elements used in these experiments were made of nylon membrane, Ultipor $N_{66}$®, commercially available from Pall Corporation, Glen Cove, N.Y. The pore size used was 0.45 $\mu$m. The membrane elements had a surface area of 0.014 $m^2$. The membranes were circular flat sheet "donuts," cut to fit the disc DMF. When assembled in the dynamic microfilter, the filtrate chamber was sealed from the feed with the use of o-rings.

Method A: Startup of the dynamic filter

Prior to introducing the milk into the dynamic filter, warm, deionized, 0.2 micron filtered water was passed through the system to startup the associated equipment. The rotational speed of the dynamic filters was brought up to operational speed with water flowing through the system. When the system had reached operating conditions, the flow of milk was turned on. The milk displaced the water in the system and the filtration commenced.

Method B: Operation of the disc dynamic microfilter

A disc DMF filter element described in the section under membrane filter elements was assembled in the disc DMF. Sanitization and sterilization was conducted using 0.1 molar caustic solution. After observing the startup procedures outlined in method A, the milk to be filtered was pumped from the holding tank into the disc DMF. The amount of concentrate and feed pressure was controlled by a valve placed on the concentrate port. Temperatures and flow rates of the feed, filtrate and concentrate, and the feed pressures were measured at various times during the course of the experiment, typically, in intervals of ten minutes. A feed rate of about 960 ml/min was maintained for all examples. The filtrate fluxes reported are those acquired when the flow had stabilized in the filtration unit.

EXAMPLES

Example One

Figure 2:
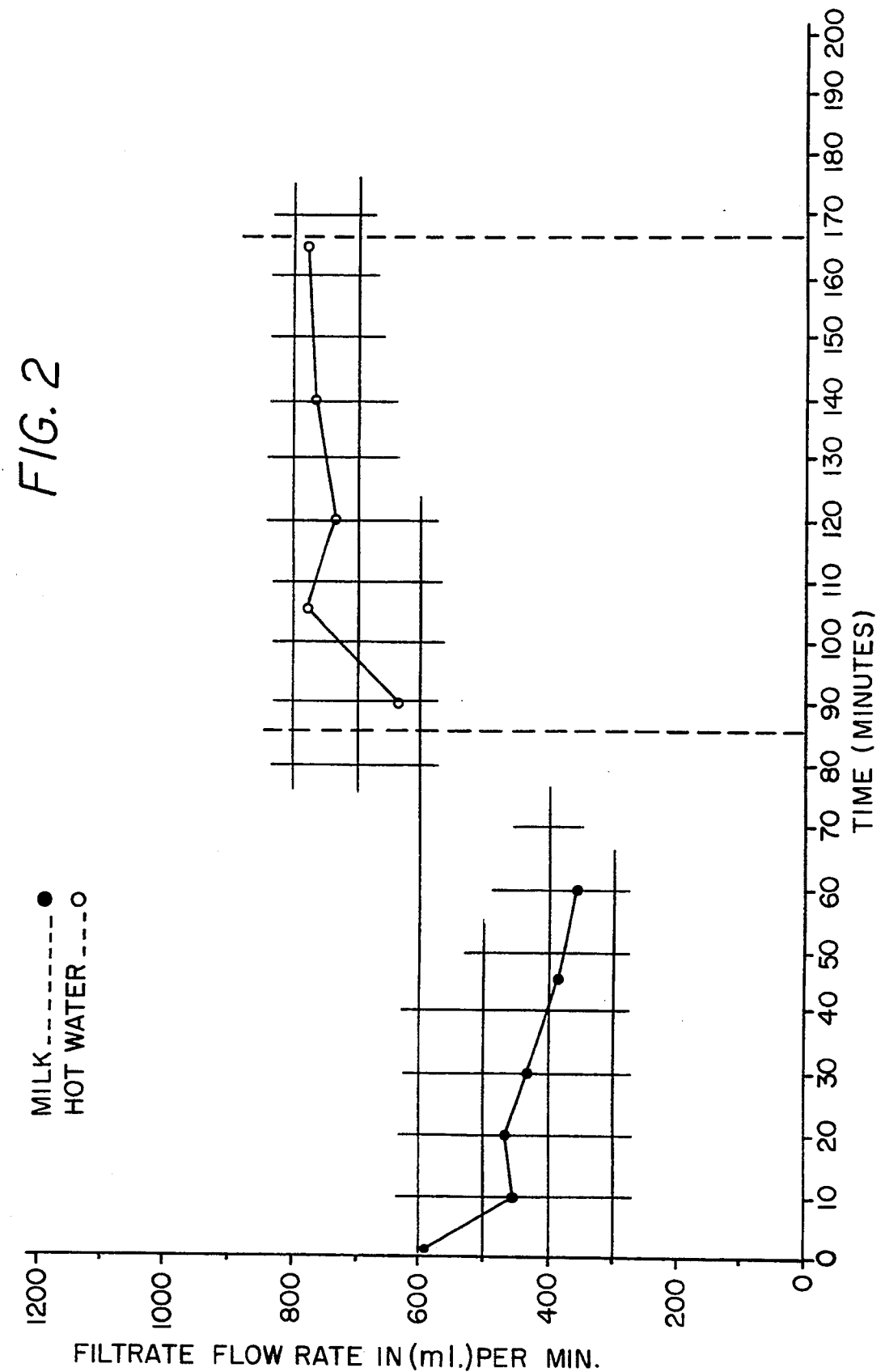
FIG. 2 is a diagram showing flux rate versus time for the process of the present invention.

Milk was heated to about 53° C. and was homogenized and pumped into a disc DMF equipped with a 0.45 micron Ultipor $N_{66}$® membrane. The procedures outlined in methods A and B were employed. A steady flux of filtrate was established quickly and the filtrate flux rate was measured over a period of about 60 minutes. As shown in FIG. 2., the initial flux rate was about 500 ml per minute, and the flux dropped to about 280 ml per minute after about one hour. At that time the filtration of milk was stopped and water heated to about 70° C. was flushed through the membrane in the forward direction. As shown in FIG. 2, the initial flux rate of the water was about 610 ml per minute, and the flux rate increased to about 790 ml per minute after a period of about 20 minutes of flushing.

Example Two

Figure 3:
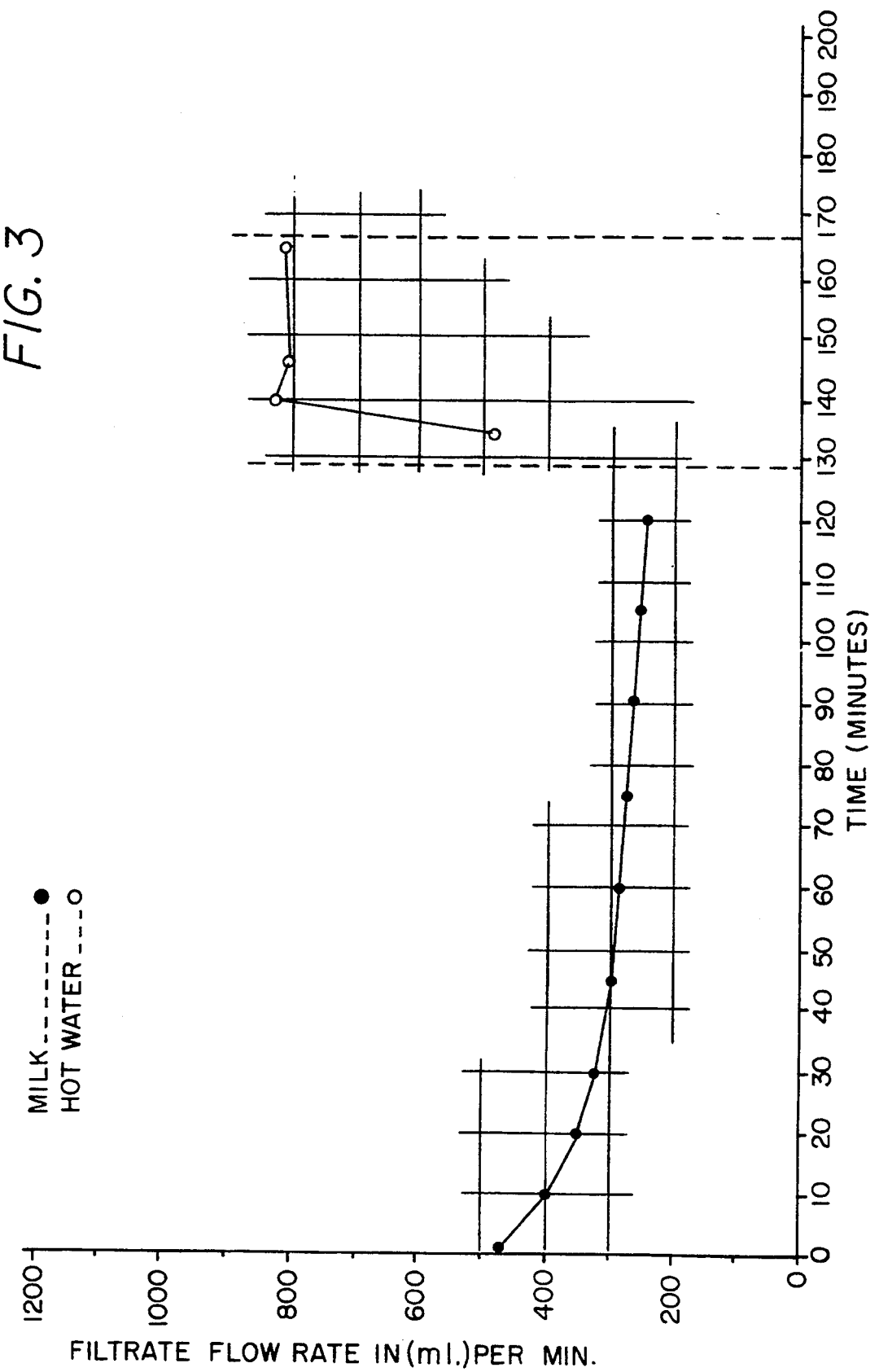
FIG. 3 is another diagram showing flux rate versus time for the process of the present invention.

Milk heated to about 53° C. was homogenized and pumped into the disc DMF of Example Two, equipped with the same 0.45 micron Ultipor $N_{66}$® membrane. The procedures outlined in method B were employed. A steady flux of filtrate was established quickly and the filtrate flux rate was measured over a period of about 120 minutes. As shown in FIG. 3., the initial flux rate was about 440 ml per minute, and the flux dropped to about 250 ml per minute after about two hours. At that time the filtration of milk was stopped and water heated to about 66° to 73° C. was allowed to flush the membrane. As shown in FIG. 3, the initial flux rate of the water was about 430 ml per minute, and the flux rate increased to about 790 ml per minute after a period of about 35 minutes.

Example Three

Figure 4:
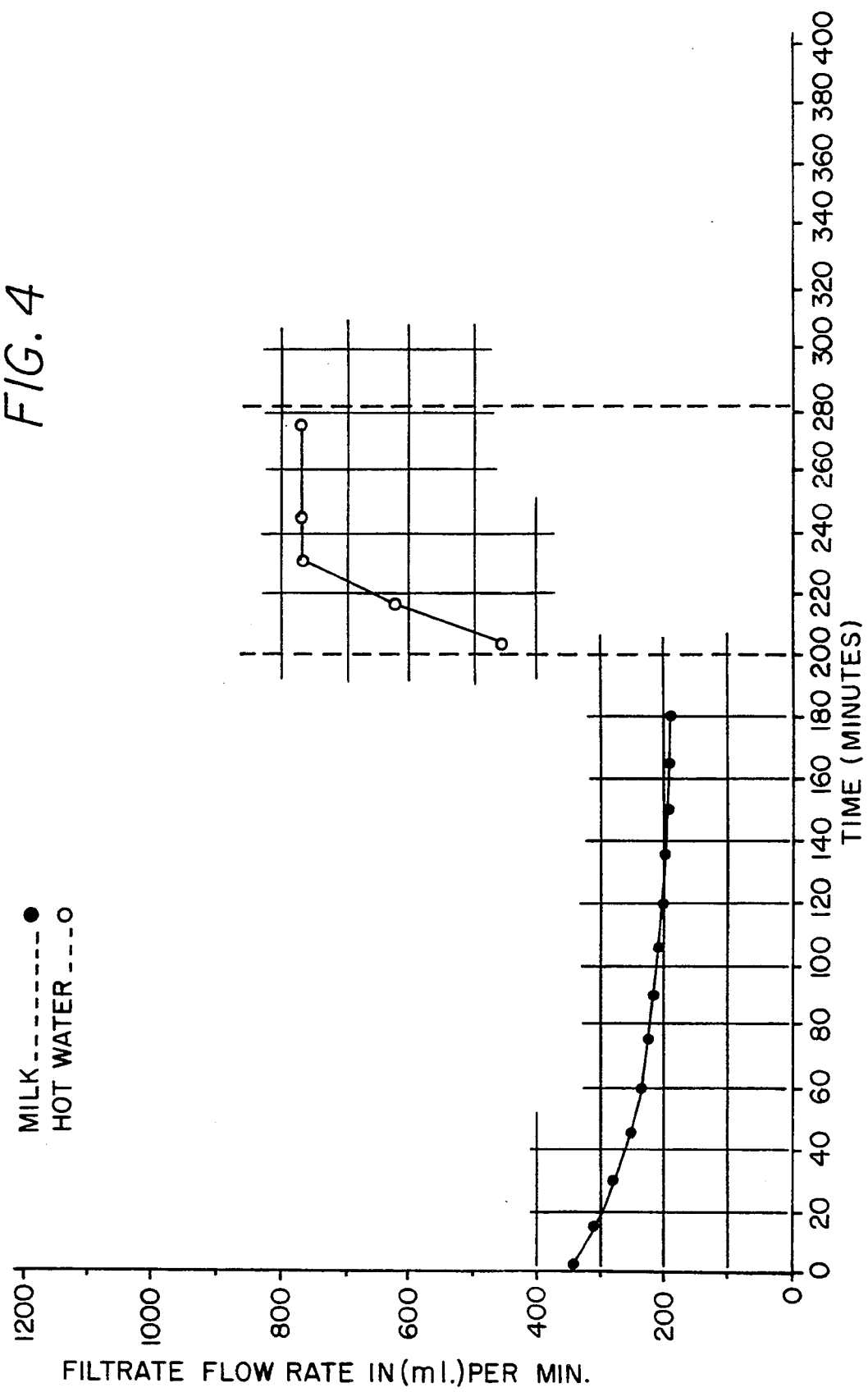
FIG. 4 is another diagram showing flux rate versus time for the process of the present invention.

Milk heated to about 53° C. was homogenized and pumped into the disc DMF of Example 2 equipped with the same 0.45 micron Ultipor $N_{66}$® membrane. The procedures outlined in method B were employed. A steady flux of filtrate was established quickly and the filtrate flux rate was measured over a period of about 180 minutes. As shown in FIG. 4., the initial flux rate was about 350 ml per minute, and the flux dropped to about 200 ml per minute after about three hours. At that time the filtration of milk was stopped and water heated to about 66° to 73° C. was allowed to flush the membrane. As shown in FIG. 4, the initial flux rate of the water was about 430 ml per minute, and the flux rate increased to about 650 ml per minute after a period of about 70 minutes.

Example Four

Figure 5:
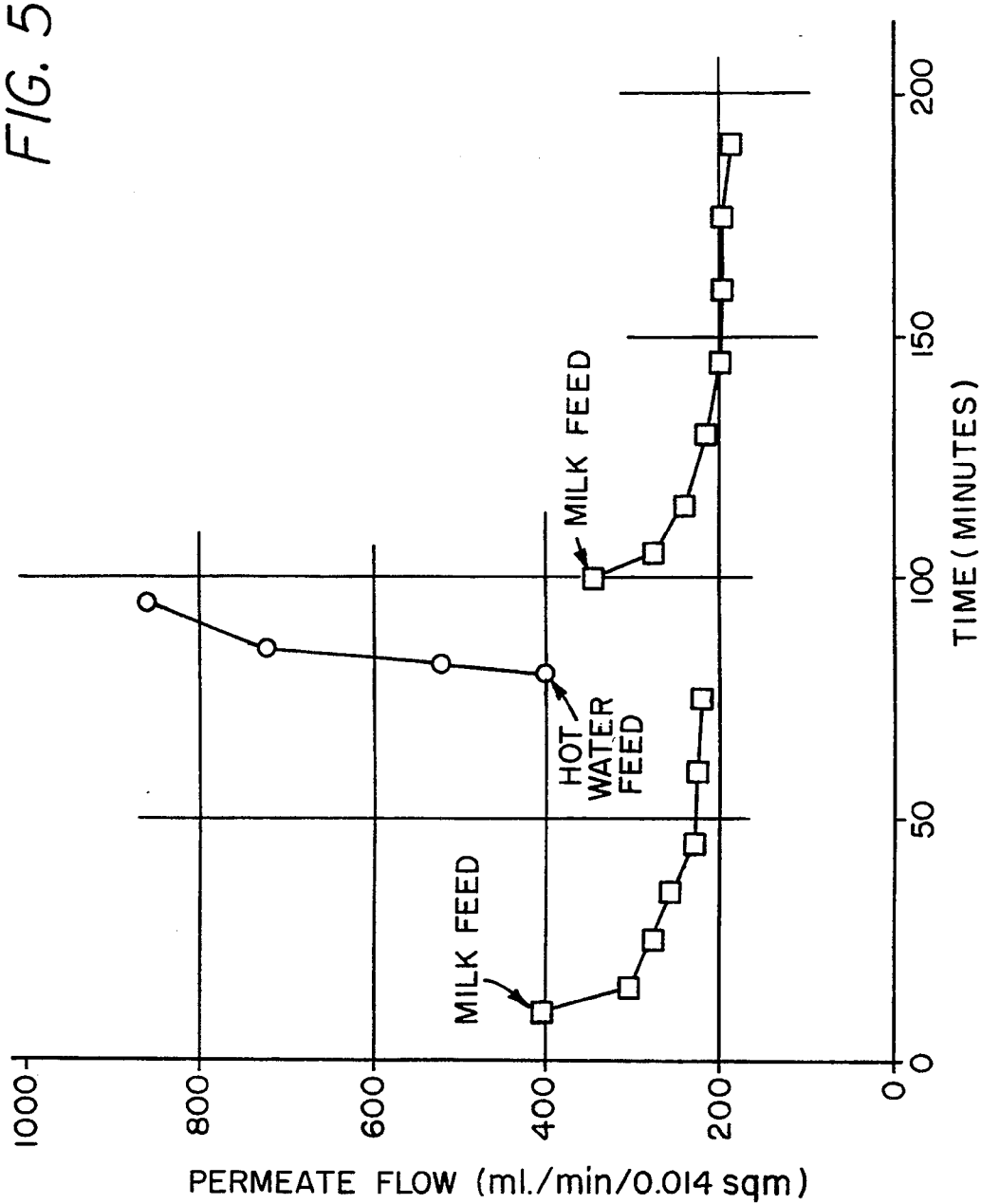
FIG. 5 is another diagram showing flux rate versus time for the process of the present invention.

Milk heated to about 53° C. was homogenized and pumped into a disc DMF equipped with a 0.45 micron Ultipor $N_{66}$® membrane. The procedures outlined in method B were employed. A steady flux of filtrate was established quickly and the filtrate flux rate was measured over an initial period of about 75 minutes. As shown in FIG. 5., the initial flux rate was about 400 ml per minute, and the flux dropped to about 210 ml per minute after about 75 minutes. At that time the filtration of milk was stopped and water heated to about 66° to 73° C. was allowed to flush the membrane. As shown in FIG. 5, the initial flux rate of the water was about 400 ml per minute, and the flux rate increased to about 850 ml per minute after a flushing period of about 20 minutes.

After the initial flushing period, the microfilter was returned to milk filtration service, and a steady flux of filtrate was established quickly. The filtrate flux rate was measured over a second period of about 180 minutes. As shown in FIG. 5., the initial flux rate, upon return to milk filtration service, was about 350 ml per minute (approximately 90 percent of the microfilter's initial filtration flux rate), and the flux dropped to about 190 ml per minute after about 80 minutes. At that time, the filtration of milk was stopped.

Example Five

Raw skim milk heated to about 50° C. was homogenized and then transferred at a rate of 1 liter/min into a disc dynamic microfilter equipped with a 0.45 micron Ultipor ® $N_{66}$ membrane. The procedures outlined in method B were employed. The filtrate flow was monitored over a period of about six hours. Initially about 600 ml/min of milk permeated the membrane. This value lowered with time. At the end of six hours of continuous operation the flow was reduced to about 220 ml/min of milk through the membrane. The filtrate flux in ml/min is shown in FIG. 6. A total of about 125 liters of milk was filtered through the membrane in the six hours of operation.

Example Six

Experiment five was repeated except that washing with hot water was conducted after about 2 hours of filtration using the following washing procedure.

Washing procedure: 0.2 micron filtered deionized water was heated to 65° C. The filtrate valve 48 was closed prior to switching valve 40. The wash water was then fed into the filtration system at about 4 liters/min. Filtration conditions of the previous examples were maintained. After about 3 minutes of rinsing the filtrate valve 48 was opened and wash water was allowed to permeate the membrane in the forward direction. This continued for another six minutes after which time the filtration unit was shut off and the water wash concluded. Within a few minutes the system was ready for further milk filtration.

The washing procedure was repeated after about five and a half hours of filtration. The filtration data is shown in FIG. 7. The post wash filtration showed a much steadier flux profile, and the rate of decline of filtrate was at a lower rate than seen in the straight-through filtration of Example Five.

The effect of using a hot water flush is quite clearly appreciated by examining the data in FIG. 7. In the first 120 minutes of operation both Examples Five and Six filtered about 66 liters of milk. In the time period between 140 minutes and 310 minutes, i.e., the period after the first wash cycle, Example Six filtered approximately 73 liters of milk while Example Five filtered about 50 liters of milk. Furthermore, in the thirty minutes of operation after the second wash cycle, Example Six filtered about 13 liters of milk whereas Example 5 filtered only about 6.5 liters of milk.

The effect of washing on the filtrate flow rate is further shown in Table 1.

TABLE 1

| Time min | Filtrate flow rate ml/min | | Difference in flow rates ml/min |
|---|---|---|---|
| | Example 6 | Example 5 | |
| 20 | 620 | 610 | 10 |
| 60 | 498 | 480 | 18 |
| 120 | 412 | 400 | 12 |
| | first wash | | |
| 145 | 450 | 372 | 78 |
| 180 | 460 | 338 | 122 |
| 240 | 415 | 280 | 135 |
| 300 | 370 | 230 | 140 |
| | second wash | | |
| 340 | 420 | 208 | 212 |
| 360 | 438 | 204 | 234 |

What is claimed is:

1. In a method for treating raw milk to produce treated milk having a lower bacterial content than the raw milk, comprising homogenizing the milk and within about 5 minutes from the homogenization, subjecting the milk to dynamic microfiltration by passing the milk through a membrane having an average pore size sufficient to reduce the bacterial content of the milk flowing therethrough, to yield a filtrate which has a lower bacterial content than the initial raw milk and a concentrate having a higher bacterial content than the initial raw milk, the improvement comprising the sequential steps of
   (1) removing the dynamic microfilter from milk filtration service after the filtration capacity of the membrane has dropped below a predetermined value and flushing the membrane with water, said flushing continuing until at least a predetermined level of filtration capacity has been restored to the microfilter;
   (2) returning the microfilter to milk filtration service;
   (3) repeating steps (1) and (2) one or more times;
   (4) subjecting the membrane to chemical cleaning for a period of time sufficient to restore the filtration capacity of the membrane to at least a minimum predetermined level; and
   (5) returning the microfilter to milk filtration service.

2. The method of claim 1 wherein steps (1) and (2) are repeated at least twice.

3. The method according to claim 2, in which the microfiltration is carried out at a milk temperature within the range of about 15° C. to about 60° C.

4. The method of claim 2 wherein the shear rate is from about 100,000 sec$^{-1}$ to about 400,000 sec$^{-1}$.

5. The method of claim 1 wherein the effective surface velocity of the fluid with respect to the membrane is from about 3 meters per second to about 50 meters per second.

6. The method of claim 1 in which the filtration occurs in less than about 30 seconds after the homogenization step.

7. The method of claim 1 wherein the membrane has a pore size from about 0.01 to about 5.0 microns.

8. The method of claim 1 wherein the membrane has a pore size from about 0.1 to about 1 micron.

9. The method of claim 1 wherein the membrane has a pore size from about 0.2 to about 0.5 micron.

10. The method according to claim 9, in which the microfiltration is carried out at a milk temperature within the range of about 15° C. to about 60° C.

11. The method of claim 1 wherein the flushing is forward flushing with water heated to a temperature from about 20° to about 100° C.

12. The method of claim 1 wherein the flushing of step (1) is employed after the flux of milk through the microfilter has dropped to 70 percent or less of the initial flux rate.

13. The method of claim 1 wherein the initial flushing of step (1) restores the microfilter to at least at least 90 percent of the microfilter's initial flux rate.

14. The method of claim 1 wherein the chemical cleaning is performed with the use of a caustic.

15. The method of claim 1 wherein the chemical cleaning is performed with the use of an enzyme.

* * * * *